United States Patent Office 3,642,869
Patented Feb. 15, 1972

3,642,869
5,8-DIHYDRONAPHTHYLOXY ACETIC ACIDS
Venkatachala Lakshmi Narayanan, North Brunswick, Frederic Peter Hauck, Somerville, and Frank Lee Weisenborn, Somerset, N.J., assignors to E. R. Squibb & Sons, Inc., New York, N.Y.
No Drawing. Filed July 30, 1969, Ser. No. 846,233
Int. Cl. C07c *69/76*
U.S. Cl. 260—473 F        10 Claims

ABSTRACT OF THE DISCLOSURE

This invention relates to new 5,8-dihydronaphthyloxy acetic acids of the formula

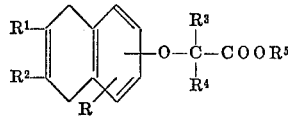

and the salts of such compounds, products which are useful as anti-inflammatory and hypocholesteremic agents.

---

This invention relates to new chemical compounds of the formula (I) 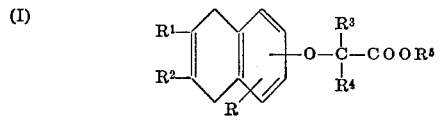

wherein R, $R^1$ and $R^2$ each is hydrogen, lower alkyl or lower alkoxy, $R^3$ and $R^4$ each is hydrogen, lower alkyl, cyclohexyl, phenyl or benzyl and $R^5$ is hydrogen, lower alkyl, cyclohexyl, phenyl or benzyl and salts of those compounds.

DETAILED DESCRIPTION OF THE INVENTION

In Formula I, the lower alkyl groups represented by the various symbols include straight and branched chain saturated hydrocarbon groups of seven or less carbon atoms such as methyl, ethyl, propyl, isopropyl butyl, isobutyl, t-butyl, amyl and the like. The lower alkoxy groups include similar alkyl groups attached to oxygen, e.g., methoxy, ethoxy, propoxy, isopropoxy and the like. Only one of $R^1$ and $R^2$ is lower alkoxy.

The compounds of Formula I, when $R^5$ is hydrogen, form basic salts with inorganic and organic bases. These salts frequently provide useful means either for solubilizing the acid or for isolating the products from reaction mixtures by forming the salt in a medium in which is it insoluble. The free acid may be obtained from the salt by neutralization, e.g., with an acid such as hydrochloric acid, dilute sulfuric acid, phosphoric acid or the like. Then any other salt may again be formed from the free acid and the appropriate inorganic or organic base. Illustrative are alkali metal salts, e.g., sodium, potassium, etc., alkaline earth metal salts, e.g., calcium, magnesium, etc., aluminum salts, ammonium salts as well as salts with organic bases such as choline, benzylamine, triethylamine, cyclohexylamine and the like.

Preferred are those compounds wherein R, $R^1$, $R^2$, $R^3$ and $R^4$ are all hydrogen and $R^5$ is either hydrogen or lower alkyl, especially ethyl and particularly when the side chain is attached to the α-position of the fused ring.

The new compounds of this invention are useful as hypocholesteremic agents. They inhibit cholesterol biosynthesis and regulate the cholesterol in the blood of warm-blooded animals such as rats or the like. Thus they are useful in the treatment of conditions such as atherosclerosis. These products may be administered orally or parenterally, e.g., at a dosage level of 2 to 40 mg./kg./day in single or divided doses, preferably 4 to 10 mg./kg. orally two to four times daily, in the form of tablets, capsules, elixirs, injectables, or the like by compounding up to about 300 mg. of a substance of Formula I or a physiologically acceptable salt thereof together with a suitable vehicle, excipient, lubricant, flavor, etc., according to accepted pharmaceutical practice.

The new compounds of this invention are also useful as anti-inflammatory agents, for example, to reduce local inflammatory conditions such as those of an edematous nature, in various animals such as rats, dogs and the like, when given orally in dosages of about 5 to 50 mg./kg./day, preferably 5 to 25 mg./kg./day, in single or 2 to 4 divided doses, as shown by the carageenan edema assay in rats. The compound may be utilized in compositions containing up to about 300 mg. of a compound of Formula 1 of a physiologically acceptable salt thereof made up in conventional manner with vehicle or carrier for oral administration to animals as indicated above. Topically, compositions containing up to about 1% by weight in a conventional cream may be used.

The products of Formula I may be produced by either of two methods described below. The symbols have the same meanings defined previously.

According to the preferred method, a naphthol of the formula (II) 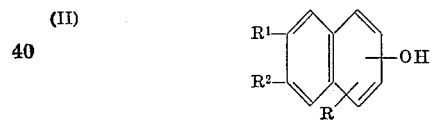

is reduced with a metal like sodium or lithium in liquid ammonia, preferably in the presence of an alcohol such as ethanol, isopropanol, t-butanol or the like [e.g., by the procedure described in Organic Syntheses, Coll. vol. 4, page 887 (1963)] to obtain the 5,8-dihydronaphthol of the formula (III) 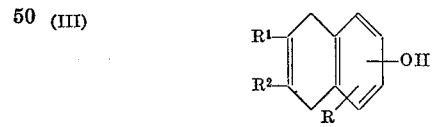

The compound of Formula III is made to react with a haloester of the formula (IV) 

wherein X is halogen, preferably bromine, and $R^5$ is lower alkyl, cycloalkyl, phenyl or benzyl, in the presence of a base like potassium hydroxide, sodium hydride, sodamide or potassium t-butoxide to obtain a product of the formula (V)

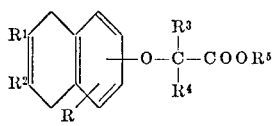

Heating the thus obtained ester of Formula V with an alcohol solution of an alkali metal hydroxide, e.g., potassium hydroxide or sodium hydroxide in methanol or ethanol, e.g., for about 0.5 to 3 hours, yields an acid of Formula I (i.e., $R^5$=H). Alternatively, an acid analogue of Formula IV (i.e., $R^5$=H) may be used, in which case an acid of Formula I (i.e., $R^5$=H) is obtained directly.

An alternate procedure involves heating a 5,8-dihydronaphthol of Formula III with a ketone of the formula (VI)

and chloroform in the presence of a base like those mentioned above.

The symbols in all of the foregoing formulas have the same meanings previously defined.

The following examples are illustrative of the invention. All temperatures are on the centrigrade scale.

EXAMPLE 1

2-[(5,8-dihydro-1-naphthyl)oxy]-2-methylpropionic acid

METHOD A (a) 5,8-dihydro-1-naphthol.—A 3 liter three-necked flask, equipped with a Dry Ice condenser, a sealed Hershberg-type stirrer, and an inlet tube, is set up in a hood and charged with 108 g. (0.75 mole) of 1-naphthol. The stirrer is started, and to the rapidly stirred flask contents is added 1 l. of liquid ammonia as rapidly as possible (about 5 minutes). When the naphthol has gone into solution (about 10 minutes), 20.8 g. (3.0 g. atoms) of lithium metal are added in small pieces and at such a rate as to prevent the ammonia from refluxing too violently. After the addition of the lithium has been completed (about 45 minutes), the solution is stirred for an additional 20 minutes and is then treated with 170 ml. (3.0 mole) of absolute ethanol which is added dropwise over a period of 30–45 minutes. The condenser is removed, stirring is continued, and the ammonia is evaporated in a stream of air introduced through the inlet tube. The residue is dissolved in 1 l. of water, and, after the solution has been extracted with two 100 ml. portions of ether, it is carefully acidified with concentrated hydrochloric acid. The product formed is taken into ether with three 250 ml. extractions, and then the ether extract is washed with water and dried over anhydrous sodium sulfate. The ether is removed by evaporation to yield 106–108 g. of crude 5,8-dihydro-1-naphthol, M.P. 69–71°. This material is dissolved in benzene, treated with charcoal, concentrated and crystallized to give pure 5,8-dihydro-1-naphthol, M.P. 70.5–72°.

(b) 2-[(5,8-dihydro-1-naphthyl)oxy]-2-methylpropionic acid, ethyl ester

Sodium hydride, 50% (3.6 g., 0.75 mole) is added in portions with stirring to 50 ml. of cooled absolute ethyl alcohol. After the evolution of hydrogen has subsided, 10.95 g. (0.075 mole) of 5,8-dihydro-1-naphthol are added, followed by the dropwise addition of 14.6 g. (0.075 mole) of ethyl bromoisobutyrate. The reaction mixture is refluxed with stirring for 16 hours. The solvent is evaporated in vacuo, the residue taken up in water and extracted with chloroform. The chloroform extract is washed with water, dried and distilled to give 13.29 g. of 2 - [(5,8-dihydro-1-naphthyl)oxy]-2-methylpropionic acid ethyl ester as a colorless liquid, B.P., 112–120°/0.3–0.35.

(c) 2-[(5,8-dihydro-1-napthyl)oxy]-2-methylpropionic acid

To a solution of 10 g. of the product of part b in 50 ml. of methyl alcohol, 30 ml. of 40% methanolic potassium hydroxide is added and the mixture is refluxed for 0.5 hour. The solvent is removed in vacuo, the residue distilled in water, acidified and extracted with chloroform. The chloroform extract is washed with water, dried and concentrated to give a thick oil which solidifies on addition of hexane, 5.2 g. The 2-[(5,8-dihydro-1-naphthyl)oxy]--methylpropionic acid is crystallized from hexane, M.P. 110–111°.

METHOD B

A mixture of 5 g. of 5,8-dihydro-1-naphthol, 8.29 g. of sodium hydroxide and 50 ml. of acetone is heated to boiling, and chloroform (6 g.) is added dropwise. After the addition, the reaction mixture is refluxed with stirring for 4 hours. The acetone is evaporated in vacuo, and the residue is dissolved in water and acidified with diluted hydrochloric acid. The solid obtained, is extracted with ether, dried (MgSO$_4$) and concentrated. The crude product obtained is crystallized twice from hexane to give 1.5 g. of 2-[(5,8-dihydro-1-napthyl)oxy]-2-methylpropionic acid as pale yellow crystals, M.P. 109–110°.

EXAMPLE 2

2-[(5,8-dihydro-2-naphthyl)oxy]-2-methylpropionic acid

Following the procedure of Example 1, but substituting an equivalent amount of 2-naphthol for 1-naphthol of Example 1, Method A (a, b and c), there is obtained 2 - [5,8 - (dihydro - 2-napthyl)oxy]-2-methylpropionic acid.

Additional compounds are produced by the procedure of Example 1 utilizing the starting materials indicated under the first two formulas in the following tables resulting in the products under the third formula in the tables.

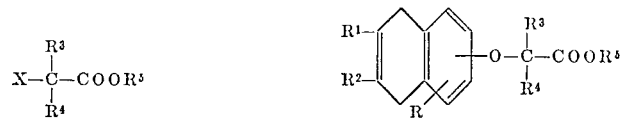

| Example | R | $R^1$ | $R^2$ | OH | $R^3$ | $R^4$ | $R^5$ | X | R | $R^1$ | $R^2$ | $R^3$ | $R^4$ | $R^5$ | Acid or ester group position |
|---|---|---|---|---|---|---|---|---|---|---|---|---|---|---|---|
| 3 | H | CH$_3$ | H | 1 | CH$_3$ | CH$_3$ | C$_2$H$_5$ | Br | H | CH$_3$ | H | CH$_3$ | CH$_3$ | C$_2$H$_5$ | 1 |
| 4 | H | C$_2$H$_5$ | C$_2$H$_5$ | 1 | CH$_3$ | CH$_3$ | C$_2$H$_5$ | Br | H | C$_2$H$_5$ | C$_2$H$_5$ | CH$_3$ | CH$_3$ | C$_2$H$_5$ | 1 |
| 5 | H | OCH$_3$ | H | 1 | CH$_3$ | CH$_3$ | C$_2$H$_5$ | Br | H | OCH$_3$ | H | CH$_3$ | CH$_3$ | C$_2$H$_5$ | 1 |
| 6 | H | OCH$_3$ | H | 2 | CH$_3$ | CH$_3$ | C$_2$H$_5$ | Br | H | OCH$_3$ | H | CH$_3$ | CH$_3$ | C$_2$H$_5$ | 2 |
| 7 | C$_3$H$_7$ | H | H | 1 | CH$_3$ | CH$_3$ | C$_2$H$_5$ | Br | 3-C$_3$H$_7$ | H | H | CH$_3$ | CH$_3$ | C$_2$H$_5$ | 1 |
| 8 | 4-C$_2$H$_5$ | CH$_3$ | H | 2 | CH$_3$ | CH$_3$ | C$_2$H$_5$ | Br | 4-C$_2$H$_5$ | CH$_3$ | H | CH$_3$ | CH$_3$ | C$_2$H$_5$ | 2 |
| 9 | 4-OC$_2$H$_5$ | H | H | 1 | CH$_3$ | CH$_3$ | C$_2$H$_5$ | Br | 4-OC$_2$H$_5$ | H | H | CH$_3$ | CH$_3$ | C$_2$H$_5$ | 1 |
| 10 | H | H | H | 1 | C$_2$H$_5$ | H | CH$_3$ | Br | H | H | H | C$_2$H$_5$ | H | CH$_3$ | 1 |
| 11 | H | H | H | 1 | H | ⬡ | C$_2$H$_5$ | Cl | H | H | H | H | ⬡ | C$_2$H$_5$ | 1 |

5

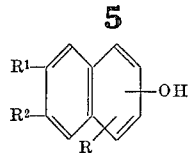        6   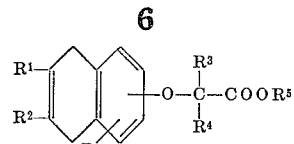

| Example | R | R¹ | R² | OH | R³ | R⁴ | R | R¹ | R² | R³ | R⁴ | R⁵ | Acid or ester group position |
|---|---|---|---|---|---|---|---|---|---|---|---|---|---|
| 12 | H | H | H | 1 | Ph | $CH_3$ | H | H | H | Ph | $CH_3$ | H | 1 |
| 13 | H | H | H | 1 | $PhCH_2$ | $C_2H_5$ | H | H | H | $PhCH_2$ | $C_2H_5$ | H | 1 |
| 14 | H | H | H | 2 | ⬡ | $CH_3$ | H | H | H | ⬡ | $CH_3$ | H | 2 |
| 15 | H | $OCH_3$ | H | 2 | $C_2H_5$ | $CH_3$ | H | $OCH_3$ | H | $C_2H_5$ | $CH_3$ | H | 2 |
| 16 | $3\text{-}OCH_3$ | H | H | 2 | $CH_3$ | $CH_3$ | $3\text{-}OCH_3$ | H | H | $CH_3$ | $CH_3$ | H | 2 |
| 17 | H | H | $CH_3$ | 1 | $PhCH_2$ | ⬡ | H | H | $CH_3$ | $PhCH_2$ | ⬡ | H | 1 |
| 18 | H | $CH_3$ | $CH_3$ | 2 | $C_3H_7$ | $CH_3$ | H | $CH_3$ | $CH_3$ | $C_3H_7$ | $CH_3$ | H | 2 |

What is claimed is:

1. A compound of the formula

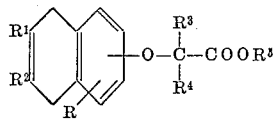

wherein R, $R^1$ and $R^2$ each is hydrogen, lower alkyl or lower alkoxy, only one of $R^1$ and $R^2$ being lower alkoxy, $R^3$, $R^4$ and $R^5$ each is hydrogen, lower alkyl, cyclohexyl, phenyl or benzyl, and pharmaceutically acceptacle metal and amine salts of said compounds.

2. A compound as in claim 1 wherein $R^1$ is lower alkyl and $R^2$, $R^3$, $R^4$ and $R^5$ each is hydrogen.

3. Alkali metal salt of a compound of claim 2.

4. A compound as in claim 1 wherein R, $R^1$, $R^2$, $R^3$, $R^4$ and $R^5$ each is hydrogen and the side chain is attached to the 1-position.

5. A compound as in claim 1 wherein R, $R^1$, $R^2$, $R^3$ and $R^4$ each is hydrogen, $R^5$ is lower alkyl and the side chain is attached to the 1-position.

6. A compound as in claim 5 wherein the lower alkyl group is ethyl.

7. A compound as in claim 1 wherein R, $R^1$, $R^2$, $R^3$, $R^4$ and $R^5$ each is hydrogen and the side chain is attached to the 2-position.

8. A compound as in claim 1 wherein R, $R^1$, $R^2$, $R^3$ and $R^4$ each is hydrogen, $R^5$ is lower alkyl and the side chain is attached to the 2-position.

9. A compound as in claim 8 wherein the lower alkyl group is ethyl.

10. A compound as in claim 1 wherein $R^3$ and $R^4$ each is methyl R, $R^1$, $R^2$ and $R^5$ each is hydrogen and the side chain is attached to the 1-position.

References Cited

Benoze et al.; J. Med. Chem., 10(2) 138–44 (1967).

LORRAINE A. WEINBERGER, Primary Examiner

J. F. TERAPANE, Assistant Examiner

U.S. Cl. X.R.

260—448, 501.1, 520, 613 D, 621 R, 624 R; 424—317, 308